United States Patent
Ronda et al.

(10) Patent No.: US 6,417,614 B1
(45) Date of Patent: Jul. 9, 2002

(54) LOW-PRESSURE MERCURY VAPOR DISCHARGE LAMP

(75) Inventors: Cornelis Reinder Ronda, Aachen (DE); Cornelis Johannes Maria Denissen, Nuth (NL); Volker Ulrich Weiler, Aachen (DE)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/561,612

(22) Filed: Apr. 27, 2000

(30) Foreign Application Priority Data

Apr. 29, 1999 (EP) ............................................. 99201339

(51) Int. Cl.$^7$ .................................................. H01J 1/62
(52) U.S. Cl. ........................................ 313/485; 313/635
(58) Field of Search .............................. 313/485, 489, 313/580, 635

(56) References Cited

U.S. PATENT DOCUMENTS 4,544,997 A  10/1985  Sueter et al.

Primary Examiner—Vip Patel
(74) Attorney, Agent, or Firm—Dicran Halajian

(57) ABSTRACT

A low-pressure mercury vapor discharge lamp comprises a discharge vessel (10) having a tubular portion (11). The discharge vessel (10) encloses a discharge space (13) provided with a filling of mercury and a rare gas in a gastight manner. The tubular portion (13) of the discharge vessel (10) is provided with a metal oxide layer (15) and a luminescent layer (17) on a surface (14) facing the discharge space (13). The discharge lamp comprises means for maintaining an electric discharge in the discharge vessel (20*b*). The discharge lamp is characterized in that the luminescent layer (17) comprises an alkali metal oxide. This alkali metal oxide is preferably sodium oxide and/or potassium oxide, and the concentration of the alkali metal oxide is $0.002 \leq Na_2O \leq 0.1\%$ by weight and/or $0.002 \leq K_2O \leq 0.1\%$ by weight. The tubular portion (11) of the discharge vessel (10) preferably has a further metal oxide layer which acts as an alkali metal-repellent layer. This further metal oxide layer preferably comprises silicon oxide. The lamp according to the invention has a comparatively low mercury consumption.

8 Claims, 1 Drawing Sheet

LOW-PRESSURE MERCURY VAPOR DISCHARGE LAMP

BACKGROUND OF THE INVENTION

The invention relates to a low-pressure mercury vapor discharge lamp comprising a discharge vessel with a tubular portion which is transmissive to radiation generated in the discharge vessel, said discharge vessel enclosing a discharge space provided with a filling of mercury and a rare gas in a gastight manner, the tubular portion of the discharge vessel being provided with a metal oxide layer and a luminescent layer on a surface facing the discharge space, and the low-pressure mercury vapor discharge lamp comprising discharge means for maintaining an electric discharge in the discharge vessel.

Mercury constitutes the primary component for (efficiently) generating ultraviolet (UV) light in mercury vapor discharge lamps. A luminescent layer comprising a luminescent material (for example, a fluorescent powder) is present on an inner wall of the discharge vessel for converting UV to other wavelengths, for example, to UV-B and UV-A for tanning purposes (sun panels) or to visible radiation for general illumination purposes. Such discharge lamps are therefore also referred to as fluorescence lamps. The discharge vessel of low-pressure mercury vapor discharge lamps is usually circular and has both elongated and compact embodiments. Generally, the tubular discharge vessel of compact fluorescence lamps has a collection of relatively short, straight parts of a relatively small diameter, which straight parts are interconnected by means of bridge parts or via bent parts. Compact fluorescence lamps are usually provided with an (integrated) lamp base. In such embodiments of the low-pressure mercury vapor discharge lamp, the discharge means comprise electrodes which are arranged in the discharge space. An alternative embodiment comprises the electrodeless low-pressure mercury vapor discharge lamps.

A low-pressure mercury vapor discharge lamp of the type described in the opening paragraph is known from U.S. Pat. No. 4,544,997. In the known discharge lamp, the tubular portion of the discharge vessel is provided with a layer of at least an oxide of at least an element of the group of scandium, yttrium, lanthanum, gadolinium, ytterbium and lutetium. The metal oxide layer inhibits attack of the wall of the tubular portion of the discharge vessel due to interaction with mercury and thus has a favorable influence on maintaining the radiation output of the lamp. The metal oxide layer is obtained by rinsing a solution of a metallo-organic compound on the surface of the discharge vessel facing the discharge space and by subsequently drying the film remaining on the surface facing the discharge space and by subsequent sintering.

Due to the metal oxide layer, the mercury consumption of the lamp, i.e. the quantity of mercury which is bound on lamp components during operation of the lamp and is thus no longer available for operation of the lamp, is relatively low as compared with that in lamps which do not have such a metal oxide layer. Nevertheless, a relatively high mercury dosage is necessary for the known lamp so as to realize a sufficiently long lifetime. After the end of the lamp lifetime, injudicious processing is detrimental to the environment.

SUMMARY OF THE INVENTION

It is an object of the invention to provide a low-pressure mercury vapor discharge lamp of the type described in the opening paragraph, consuming a relatively small quantity of mercury.

According to the invention, the discharge lamp is therefore characterized in that the luminescent layer comprises an alkali metal oxide.

A number of parts of a low-pressure mercury vapor discharge lamp (for example, the discharge vessel, the luminescent materials, etc.) is not inert to mercury which is present in the discharge. Such parts have the tendency of absorbing mercury. This does not only imply that more mercury should be present in the discharge vessel so as to ensure that the discharge lamp remains in operation during its lifetime, but also that the efficiency of the discharge lamp during its lifetime gradually decreases because many Hg compounds absorb UV and/or visible light. During the lifetime of the low-pressure mercury vapor discharge lamp, the bare glass of the discharge vessel absorbs several milligrams of mercury. By providing a coating (for example, of $SiO_2$) on the discharge vessel, this absorption is reduced by 50%, and by providing a suitable metal oxide layer (for example, a dual coating of $SiO_2/Al_2O_3$ or $SiO_2/Y_2O_3$) this absorption is reduced to less than a few hundred $\mu g$. The inventors have found that the reduction of the quantity of mercury available for the discharge in the discharge space is mainly caused by the exchange of the alkali metal (for example, Na and/or K) and Hg, and by the absorption of mercury by the surface of the discharge vessel facing the discharge space. During operation of the discharge lamp, mercury enters the wall of the discharge vessel, while the alkali metal oxide simultaneously leaves the wall of the discharge vessel. Mercury consumption through the wall of the discharge vessel is related to imperfections in the metal oxide layer provided on the inner wall of the discharge vessel. Such imperfections give rise to unwanted alkali metal oxide diffusion (for example, diffusion of $Na_2O$ and/or $K_2O$) during processing of the discharge lamp, and also to the possibility of mercury atoms adhering to uncoated parts of the discharge vessel, whereafter diffusion of mercury takes place in the glass. Since the diffusion of the alkali metal oxide is generally driven by a concentration gradient between the wall of the discharge vessel and the luminescent layer, the presence of sodium oxide in the luminescent layer causes a much lower diffusion of the alkali metal oxide from the wall of the discharge vessel during processing of the discharge lamp.

By suitably choosing the concentration of sodium oxide in the luminescent layer, the diffusion of the alkali metal oxide from the wall of the discharge vessel can be largely prevented. To this end, a preferred embodiment of the low-pressure mercury vapor discharge lamp according to the invention is characterized in that the alkali metal oxide in the luminescent layer comprises sodium oxide and/or potassium oxide, in which the concentration of alkali metal oxide is $0.001 \leq Na_2O \leq 0.2\%$ by weight and/or $0.001 \leq K_2O \leq 0.2\%$ by weight For alkali metal oxide concentrations of less than 0.001% by weight, there is no noticeable reduction of the concentration gradient between the wall of the discharge vessel and the luminescent layer. For alkali metal oxide concentrations of more than 0.2% by weight, the diffusion of $Na_2O$ and/or $K_2O$ from the wall of the discharge vessel is not further inhibited.

The concentration of the alkali metal oxide in the luminescent layer is preferably $0.002 \leq Na_2O \leq 0.1\%$ by weight and/or $0.002 \leq K_2O \leq 0.1\%$ by weight.

An attractive embodiment of the lamp according to the invention is characterized in that the metal oxide layer on the surface of the tubular portion facing the discharge space comprises at least an oxide of at least an element from the group of magnesium, aluminum, titanium, zirconium, and the rare earths. In this description and the claims, the rare earths are understood to be scandium, yttrium, lanthanum and the lanthanides. Such a layer is highly inert so that, also in the long term, the mercury consumption due to reactions of mercury from the filling with the metal oxide layer is small.

Favorable results are obtained with an embodiment of the lamp according to the invention, which is characterized in that the metal oxide layer of the tubular portion comprises aluminum oxide and/or yttrium oxide. Such a layer may be provided, for example, as a suspension of aluminum oxide/yttrium oxide particles, for example, by atomizing the suspension or by causing it to flow across the inner surface of the discharge vessel.

An advantageous embodiment is characterized in that the tubular portion of the discharge vessel has a further metal oxide layer between the surface facing the discharge space and the metal oxide layer (hereinafter also referred to as protective layer). The further metal oxide layer functions as an alkali metal-repellent layer. Such a layer further inhibits the transport of alkali metal ions such as sodium and potassium ions from the wall of the discharge vessel to the discharge space. Mercury consumption by formation of amalgams with alkali metals is thereby further inhibited.

A further favorable embodiment of the lamp according to the invention is characterized in that the further metal oxide layer comprises silicon oxide. Silicon oxide is a very good barrier for alkali metal ions. Such a layer can be easily provided. It is sufficient to rinse a solution of hydrolyzed tetraethyl orthosilicate (TEOS) on the surface of the discharge vessel facing the discharge space. After the silicon oxide thus provided on the surface has been dried, the metal oxide layer can be applied directly. A thermal treatment is favorable so as to enhance the density of the layer. The thermal treatment coincides, for example, with a thermal treatment of the protective layer. If a separate thermal treatment is superfluous for the protective layer, the thermal treatment may coincide with a thermal treatment for removing auxiliary substances such as binding agents from the suspension, if the lamp is provided with a luminescent layer as a suspension of luminescent material.

The discharge vessel has, for example, a luminescent layer which is composed of blue-luminescing barium magnesium aluminate activated by bivalent europium (BAM), green-luminescing cerium gadolinium terbium pentaborate, in which terbium is the activator (CBT), and red-luminescing yttrium oxide activated by trivalent europium (YOX). Alternative luminescent materials are green-luminescing cerium terbium aluminate (CAT), notably suitable for compact fluorescence lamps. Further alternative luminescent materials are blue-luminescing europium strontium halophosphates, for example, europium strontium chlorophosphate (SECA) and green-luminescing cerium terbium lanthanum phosphate (LAP).

These and other aspects of the invention are apparent from and will be elucidated with reference to the embodiment(s) described hereinafter.

BRIEF DESCRIPTION OF THE DRAWINGS

The Figures are only diagrammatic and not drawn to scale. For the sake of clarity, some dimensions are strongly exaggerated. Similar components in the Figure are denoted as much as possible by the same reference numerals.

DETAILED DESCRIPTION OF THE PREFERRED EMBODIMENTS

Figure 1:
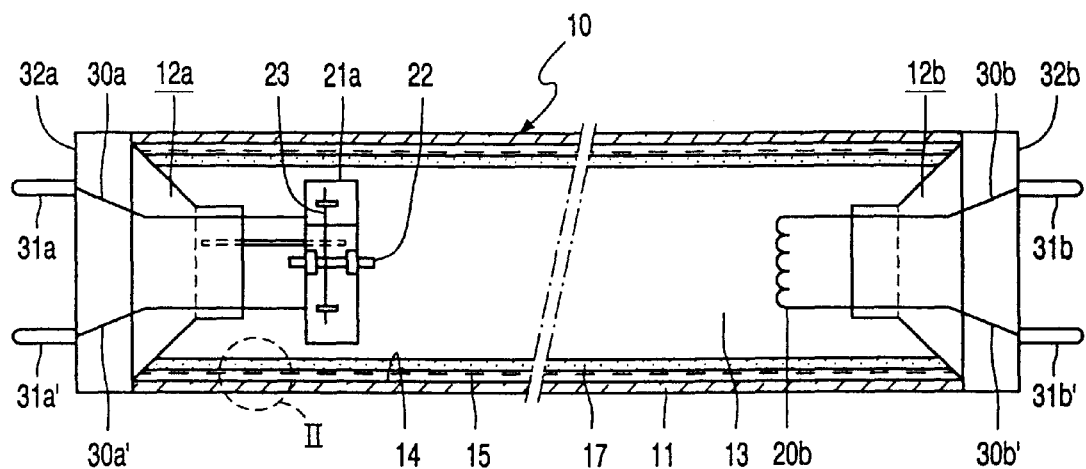
FIG. 1 shows an embodiment of the low-pressure mercury vapor discharge lamp according to the invention in a longitudinal section.

FIG. 1 shows a low-pressure mercury vapor discharge lamp comprising a glass discharge vessel 10 having a tubular portion 11 which is transmissive to radiation generated in the discharge vessel 10, and a first and a second end portion 12a, 12b. The tubular portion 11 has a length of approximately 120 cm and an internal diameter of 2.5 cm in this embodiment. The discharge vessel 10 encloses a discharge space 13 comprising a filling of 1 mg of mercury and a rare gas, in this example argon, in a gastight manner. The end portions 12a; 12b each support an electrode 20b (the electrode on the first end portion 12a is not shown in FIG. 1) arranged in the discharge space 13. The electrodes 20b constitute the discharge means in this embodiment. Current supply conductors 30a, 30a'; 30b, 30b' of the electrodes 20b extend through the end portions 12a; 12b to beyond the discharge vessel 10. The current supply conductors 30a, 30a'; 30b, 30b' are connected to contact pins 31a, 31a'; 31b, 31b' secured to lamp base 32a; 32b. An electrode ring 21a is arranged around each electrode 20b (the electrode ring on the second end portion 12b is not shown in FIG. 1).

A glass capsule 22 is clamped on the electrode ring 21a, with which capsule mercury is dosed during manufacture of the discharge lamp. To this end, a metal wire 23 which was tightened on the glass capsule 22 was inductively heated in a high-frequency electromagnetic field, during which the capsule 22 was cut through and the mercury to be dosed from the capsule 22 was released in the discharge space 13.

The metal oxide layer 15 (see also FIG. 2) on the surface 14 of the tubular portion 11 facing the discharge space comprises an oxide of at least an element from the group of magnesium, aluminum, titanium, zirconium and the rare earths. In this case, the metal oxide layer 15 (also referred to as protective layer) is an yttrium oxide layer having a coating weight of 30 $\mu g/cm^2$.

Figure 2:
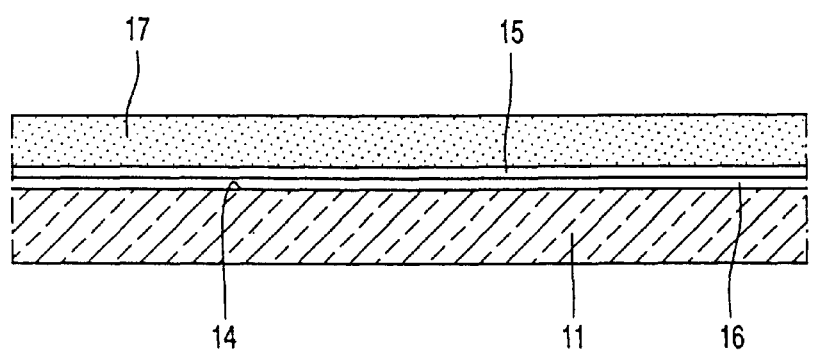
FIG. 2 shows a detail of the discharge lamp of FIG. 1, taken on the line II in FIG. 1.

In the embodiment of FIGS. 1 and 2, the tubular portion 11 of the discharge vessel 10 has a further metal oxide layer 16 operating as an alkali metal-repellent layer between the surface 14 facing the discharge space and the yttrium oxide layer 15. In the embodiment shown, the further metal oxide layer 16 is made of silicon oxide and has a coating weight of 12 $\mu g/cm^2$. The yttrium oxide layer 15 has a luminescent layer 17 (see also FIG. 2) with a coating weight of 1.8 $mg/cm^2$, comprising the luminescent materials BAM, CBT and YOX. Alternative luminescent materials are CAT, SECA and LAP.

According to the invention, the luminescent layer 17 comprises sodium oxide. Unwanted diffusion of alkali metal oxide from the wall of the discharge vessel 10, which diffusion is generally driven through a concentration gradient between the wall of the discharge vessel 10 and the luminescent layer 17, is thereby strongly reduced. Sodium oxide in the luminescent layer 17 is particularly suitable, with the concentration of the sodium oxide being in the range of $0.002 \leq Na_2O \leq 0.1\%$ by weight.

An alternative embodiment of the low-pressure mercury vapor discharge lamp according to the invention is constituted by the so-called electrodeless low-pressure mercury vapor discharge lamps (not shown), in which the discharge means comprise a coil outside a discharge space surrounded by a discharge vessel, provided with a winding of an electric conductor, which coil is fed during operation with a high-frequency voltage via current supply conductors.

The measure according to the invention results in a strong reduction of the quantity of mercury which is bound, during operation, on the tubular portion 11 of the discharge vessel 10. This results in a low-pressure mercury vapor discharge lamp consuming a relatively very small quantity of mercury during its lifetime.

For the sake of an experiment, two groups of 10 lamps according to the invention and one group of 10 lamps not according to the invention were made. In all cases, the tubular portion 11 of the discharge vessel 10 was provided with a luminescent layer 17, while an yttrium oxide layer was present between the surface 14 of the tubular portion 11 facing the discharge space 13 and the luminescent layer 17. Of each group of ten lamps, five also have an alkali metal-repellent layer 16 of silicon oxide between the surface 14 of the tubular portion 11 facing the discharge space 13 and the yttrium oxide layer 15. The silicon oxide layer 16 and the yttrium oxide layer 15 have a coating weight of 12 and 55 $\mu g/cm^2$, respectively. The coating weight of the luminescent layer 17 is 1.8 $mg/cm^2$. In the first group of lamps according to the invention, the luminescent layer comprises 0.08% by weight of $Na_2O$. In the second group of lamps according to the invention, the luminescent layer does not comprise alkali metal oxide.

The lamps were provided with a filling of 0.4 mg of mercury and argon. After 1000 operating hours, the total quantity of bound mercury was measured. The measuring method used is based on the phenomenon that free mercury moves towards the negative electrode in a DC-operated lamp. The movement of mercury is visible by a decrease of intensity of the light emitted by the lamp near the end with the positive electrode. In the implementation of the measuring method during the experiment, the polarity of the DC voltage is reversed at the instant when the luminous flux near the end with the positive pole has decreased to 60% of the nominal value. The time elapsing between this instant and the instant when the luminous flux near the opposite end has decreased to 60% of the nominal value is a measure of the still available quantity of free mercury and hence of the mercury consumption. The measuring method was calibrated on the basis of results obtained by means of wet-chemical analysis.

The mercury consumption (in $\mu g$) in the period up to 1000 hours is shown in Table I. The Table also indicates, between brackets, the mercury consumption in the period between 1 and 1000 hours.

TABLE 1

Mercury consumption in $\mu g$ in the operating period up to 1000 hours, and mercury consumption in the operating period between 1 and 1000 hours (shown between brackets) for discharge lamps according to the invention (with $Na_2O$ in the luminescent layer) and lamps not according to the invention (without $Na_2O$).

| Coating tubular portion | Luminescent layer | |
| --- | --- | --- |
|  | without $Na_2O$ | With $Na_2O$ |
| $Y_2O_3$ | 220 (114) | 144 (81) |
| $SiO_2/Y_2O_3$ | 147 (69) | 100 (36) |

It is apparent from the measurements that the measure according to the invention results in a significant reduction of the mercury consumption. The reduction varies from approximately 30% in discharge lamps having an yttrium oxide layer in combination with an alkali metal-repellent layer of silicon oxide on the tubular portion to approximately 35% in discharge lamps having only an yttrium oxide layer on the tubular portion.

It will be evident that many variations within the scope of the invention can be conceived by those skilled in the art. For example, the first and the second end portion may also be provided with a metal oxide layer on a surface facing the discharge space.

The protective scope of the invention is not limited to the embodiments described. The invention relates to each and every novel characteristic feature and each and every combination of characteristic features. Reference numerals in the claims do not limit their protective scope. The use of the word "comprising" does not exclude the presence of element other than those mentioned in the claims. The use of the word "a" or "an" preceding an element does not exclude the presence of multitude of such elements.

What is claimed is:

1. A low-pressure mercury vapor discharge lamp comprising a discharge vessel (10) with a tubular portion (11) which is transmissive to radiation generated in the discharge vessel (10), said discharge vessel (10) enclosing a discharge space (13) provided with a filling of mercury and a rare gas in a gastight manner, the tubular portion (11) of the discharge vessel (10) being provided with a metal oxide layer (15) and a luminescent layer (17) on a surface (14) facing the discharge space (13), the low-pressure mercury vapor discharge lamp comprising discharge means (20b) for maintaining an electric discharge in the discharge vessel (10), characterized in that the luminescent layer (17) comprises an alkali metal oxide.

2. A low-pressure mercury vapor discharge lamp as claimed in claim 1, characterized in that the alkali metal oxide in the luminescent layer (17) comprises sodium oxide and/or potassium oxide, in which the concentration of alkali metal oxide is $0.001 \leq Na_2O \leq 0.2\%$ by weight and/or $0.001 \leq K_2O \leq 0.2\%$ by weight.

3. A low-pressure mercury vapor discharge lamp as claimed in claim 2, characterized in that the concentration is $0.002 \leq Na_2O \leq 0.1\%$ by weight and/or $0.002 \leq K_2O \leq 0.1\%$ by weight.

4. A low-pressure mercury vapor discharge lamp as claimed in claim 1, characterized in that the metal oxide layer (15) comprises at least an oxide of at least an element from the group of magnesium, aluminum, titanium, zirconium, and the rare earths.

5. A low-pressure mercury vapor discharge lamp as claimed in claim 4, characterized in that said metal oxide layer (15) comprises aluminum oxide and/or yttrium oxide.

6. A low-pressure mercury vapor discharge lamp as claimed in claim 1, characterized in that the tubular portion (11) of the discharge vessel (10) has a further metal oxide layer (16) between the surface (14) facing the discharge space and the metal oxide layer (15).

7. A low-pressure mercury vapor discharge lamp as claimed in claim 6, characterized in that the further metal oxide layer (16) comprises silicon oxide.

8. A low-pressure mercury vapor discharge lamp as claimed in claim 1, characterized in that the luminescent material comprises a mixture of green-luminescing, terbium-activated cerium magnesium aluminate, cerium aluminate or cerium lanthanum phosphate, blue-luminescing, europium-activated barium magnesium aluminate or a strontium halophosphate or a strontium halophosphate, and red-luminescing yttrium oxide activated by trivalent europium.

* * * * *